June 10, 1969      C. P. PARSONS      3,448,729
VAPOR AND DROPLET SEPARATOR FOR EBULLIENT-COOLED ENGINES
Filed Feb. 8, 1967
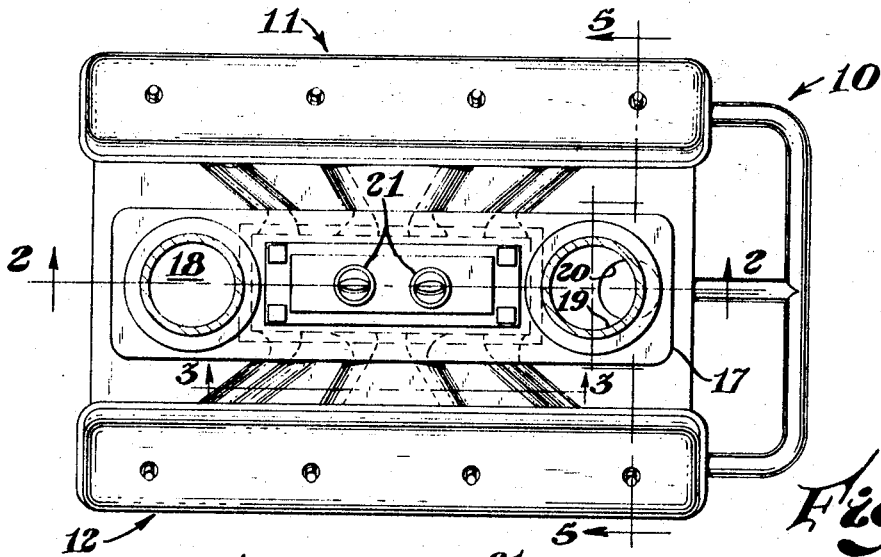
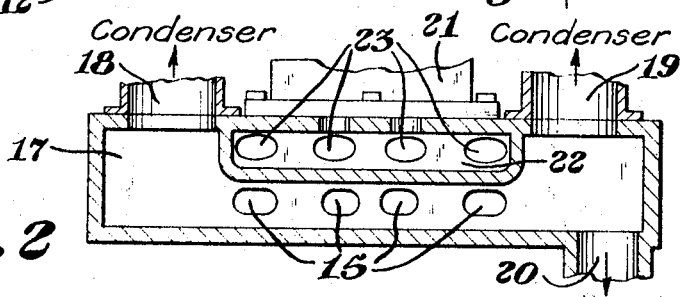
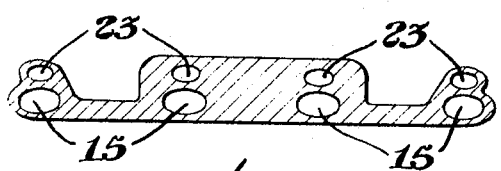
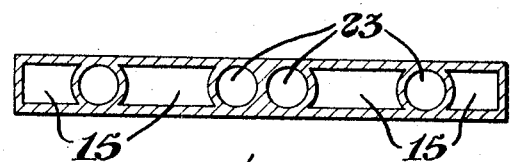
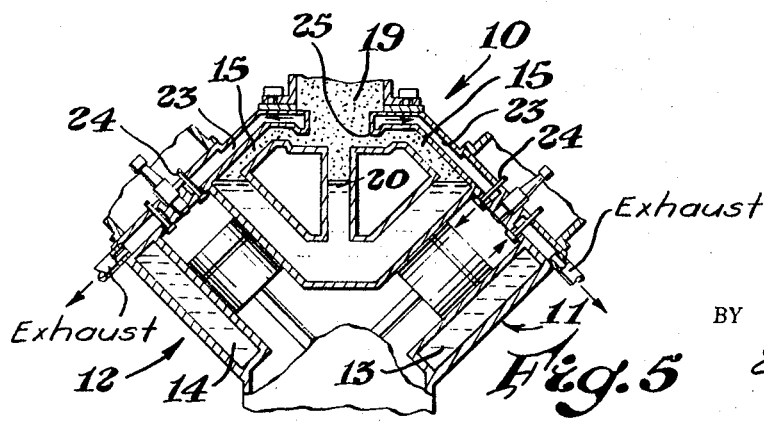
INVENTOR.
Curtis P. Parsons
BY Edward E. Schilling
ATTORNEY United States Patent Office 3,448,729
Patented June 10, 1969

3,448,729
VAPOR AND DROPLET SEPARATOR FOR
EBULLIENT-COOLED ENGINES
Curtis P. Parsons, Midland, Mich., assignor to The Dow Chemical Company, Midland, Mich., a corporation of Delaware
Filed Feb. 8, 1967, Ser. No. 614,594
Int. Cl. F01p 9/02
U.S. Cl. 123—41.2                 5 Claims

ABSTRACT OF THE DISCLOSURE

An improvement in the cooling system of an ebullient-cooled internal combustion engine whereby a vapor-droplet mixture from the region of coolant-jacketed cylinders is directed along respective fluid passages connected to at least one header leading to a condenser and the fluid passages are externally cooled by respective streams of air-fuel mixture, the fluid passages and the passages for air-fuel mixture having a common heat conductive metal wall, preferably throughout at least about one-half of the length of the fluid passages.

BACKGROUND OF THE INVENTION

Field of the invention

The invention relates to an improvement in the method and apparatus for reducing the vapor and droplet load of coolant vapors in an ebullient-cooled internal combustion engine in order to substantially eliminate the possibility of condenser flooding in such an engine.

Description of the prior art

Ebullient-cooled engines are well known in the art. A problem in such engines effecting operability is flooding of condensers. Flooding arises when collected and/or coolant liquid is entrapped in the lower part of the condenser so as to interfere with further entry of vapor into the condenser. The entering vapor also interferes with the proper drainage from the condenser of the collected and condensed liquid which must be returned to the water jacket of the engine. It is also highly desirable to reduce the load of condensing liquid on the condenser surfaces since a film of liquid coolant on a condenser surface substantially reduces the heat exchange capacity of the condenser.

Various methods have been employed heretofore to avoid flooding of the condenser in ebullient-cooled engines including disposing the condenser at an angle off the vertical in order that condensed and collected liquid drains down the lower side of the port of the condenser in a manner so as not to interfere with ingress of vapor. Attempts have also been made to use exhaust manifold means for heating fuel or air-fuel mixtures as in conventional condensed coolant cooled engines. However, none of these schemes provide for the separation of the considerable quantity of liquid droplets carried over from the engine to the condenser by the coolant vapor in an ebullient-cooling system which operates quite differently from a condensed coolant system.

OBJECTS OF THE INVENTION

It is a principal object of the invention to provide relatively simple and reliable apparatus for the reduction of the vapor and droplet load of coolant vapors in an ebullient-cooled internal combustion engine.

Another object of the invention is to provide an ebullient-cooled engine in which heat from the coolant vapor is used to provide heat for the intake manifold.

It is a further object of the invention to provide a method for reducing the vapor and droplet load of coolant vapors in an operating ebullient-cooled internal combustion engine.

SUMMARY OF THE INVENTION

The improvement in an ebullient-cooled internal combustion engine according to the invention lies in the provision of a substantially common heat conductive metal wall between each of the fluid passages for coolant and respective passages for air-fuel mixture wherein such fluid passages extend from the water jacket around the engine cylinders to at least one header leading to a coolant vapor condenser, and, such passages for air-fuel mixture extend from an intake manifold to the respective intake valves of the engine cylinders. The method comprises cooling said fluid passages externally thereto with respective streams of air-fuel mixture.

BRIEF DESCRIPTION OF THE APPARATUS AND METHOD

The invention will be more clearly understood with reference to the drawings in which:

FIG. 1 is a top plan view of an ebullient-cooled internal combustion V-8 engine, the air cleaner, starter, generator, clutch housing, ignition wiring and the condenser being omitted for purposes of simplicity of illustration;

FIG. 2 is a fragmentary view taken in vertical section along line 2—2 of FIG. 1, the fluid return, the condenser and the carburetor being substantially omitted for purposes of illustration;

FIG. 3 is a view in vertical section taken along line 3—3 of FIG. 1 showing the relative disposition of fluid passages for coolant vapors and passages for air-fuel mixture;

FIG. 4 is a view similar to FIG. 3 but showing a different embodiment of the invention; and FIG. 5 is a fragmentary view in vertical section taken along line 5—5 of FIG. 1 showing opposed engine cylinders in the V-8 configuration, coolant-jackets around the cylinders, fluid passages directed to a header and passages for air-fuel mixture associated with the said fluid passages. The condenser, the carburetor, the ignition wiring, the exhaust manifold, the crankshaft and the oil pan have been substantially omitted for the sake of simplicity of illustration.

In FIGS. 1 and 5 there is shown an internal combustion engine generally indicated by the numeral 10 having a V-8 configuration with two banks of cylinders 11 and 12 respectively. The cylinders are surrounded by respective coolant jackets 13 and 14 which communicate via a plurality of fluid passages 15 with a central header 17. The header 17 serves an important purpose in facilitating the separation of coolant droplets from coolant vapor. In the header 17, space is provided for slowing vapor flow so that droplets tend to fall out, collect and drain back to the coolant jackets 13 and 14. One or more condensers (not shown) are mounted above the engine. Vapor from the coolant system is conducted from the central header 17 to the condenser or condensers via vapor passages 18 and 19, respectively. Condensed coolant returning to the central header 17 drains through down-comer 20 and is thus returned to the coolant jackets 13 and 14.

Incoming air and fuel are mixed in a carburetor 21. The carbureted fuel-air mixture enters the intake manifold 22 from the carburetor 21 and is conveyed by passages for air-fuel mixture 23 to intake valves 24 of the cylinders.

An essential feature of the present invention is the provision of structure in which the fluid passages 15 are immediately adjacent the passages for air-fuel mixture 23 and have substantially a common heat conductive wall therebetween whereby the air-fuel mixture is warmed and the coolant vapor is cooled. Instead of being formed with a common heat conductive wall, the fluid passages and the passages for air-fuel mixture may be separately formed, provided the external faying surfaces of the conduits containing the passages fit together precisely in intimate face to face relationship so as to give substantially the same heat exchange effect as a common wall. If desired, a baffle element 25, as shown particularly in FIG. 5, may be used to further direct coolant vapor containing droplets so that the droplets are not readily carried mechanically up vapor passages 18 or 19 to the condenser.

While it is essential that the fluid passages are, respectively, in effective heat exchange relationship with respective passages for the air-fuel mixture, the extent of heat exchange is a matter of choice for the designer. If the amount of heat exchange is maximized, the designer will obtain greater fuel economy and smoothness of operation of the engine. On the other hand, minimizing the extent of heat exchange will increase full throttle performance though at a sacrifice in condensing of the coolant according to the present invention, i.e., wherein an ebullient cooling system is employed. However, because the desiger should have freedom to reach a particular goal, the optimum heat exchange relationship for the numerous design possibilities cannot readily be specified, although the relationship is readily determined mathematically by the designer, once his goal is selected, according to well known engineering principles.

The extent of heat exchange is increased by providing relatively large diameter passages for each of the coolant vapor and the air-fuel mixture; by providing a greater extent of common wall; and by employing a thinner common wall. On the other hand, the extent of heat exchange is decreased upon providing for faster coolant or air-fuel mixture flow as by using a small diameter passage therefor, or by using a thicker common wall. Generally, with conventional sizes of fluid pasages and passages for air-fuel mixture, it is sufficient to have a common wall or equivalent effective heat exchange wall for at least about one-half of the length of substantially each fluid passage.

The passages may be in most any spatial relationship e.g., juxtapositioned vertically as shown in the sectional view in FIG. 3, or positioned side by side as shown in similar sectional view in FIG. 4.

I claim:

1. In an ebullient-cooled internal combustion engine having fluid passages extending from the water jacket around the engine cylinders to at least one central header and an intake manifold with passages for air-fuel mixture extending from the said manifold to the respective intake valves of the cylinders, the improvement which comprises: providing a common heat conductive metal wall between each of said fluid passages and respective said passages for air-fuel mixture.

2. The improvement in ebullient-cooled internal combustion engines as in claim 1 in which those fluid passages and passages for air-fuel mixture having a common heat conductive metal wall are substantially juxtaposed throughout at least about one-half of the length thereof each fluid passage with each passage for air-fuel mixture disposed substantially vertically above a respective fluid passage.

3. The improvement in ebullient-cooled internal combustion engines as in claim 1 in which those fluid passages and passages for air-fuel mixture having a common heat conductive metal wall are substantially juxtaposed throughout at least about one-half of the length thereof with each passage for air-fuel mixture disposed substantially horizontally side by side with a respective fluid passage.

4. A method of reducing the vapor and droplet load of coolant vapors in an operating ebullient-cooled internal combustion engine which comprises: leading vapor-droplet mixture from the region of coolant-jacketed cylinders to at least one header leading to a condenser via respective fluid passages; and cooling the fluid passages externally thereof with streams of air-fuel mixture that are being conveyed from an intake manifold to engine intake valves.

5. The method as in claim 4 in which the streams of air-fuel mixture cool the upper sides of the fluid passages.

References Cited

UNITED STATES PATENTS

| | | | |
|---|---|---|---|
| 1,731,583 | 10/1929 | Mallory. | |
| 1,822,147 | 9/1931 | Horning. | |
| 2,767,699 | 10/1956 | Engstrom | 123—122 |
| 2,844,129 | 7/1958 | Beck et al. | 123—41.21 |
| 2,936,746 | 5/1960 | Rindquist. | |
| 3,312,204 | 4/1967 | Barlow | 123—41.25 |

AL LAWRENCE SMITH, *Primary Examiner.*

U.S. Cl. X.R.

123—52, 122